United States Patent
Fouquet et al.

(10) Patent No.: US 9,949,502 B2
(45) Date of Patent: Apr. 24, 2018

(54) ELECTRIC APPLIANCE FOR PREPARING JUICE BY PRESSING FOOD

(71) Applicant: SANTOS, Vaulx-en-Velin (FR)

(72) Inventors: Nicolas Fouquet, Chassieu (FR); Cedric Gelin, Saint Fons (FR)

(73) Assignee: SANTOS, Vaulx-en-Velin (FR)

( * ) Notice: Subject to any disclaimer, the term of this patent is extended or adjusted under 35 U.S.C. 154(b) by 132 days.

(21) Appl. No.: 14/724,684

(22) Filed: May 28, 2015

(65) Prior Publication Data

US 2015/0342244 A1 Dec. 3, 2015

(30) Foreign Application Priority Data

May 28, 2014 (FR) ..................................... 14 54845

(51) Int. Cl.
| | |
|---|---|
| B02C 15/00 | (2006.01) |
| A23N 1/02 | (2006.01) |
| A23L 2/04 | (2006.01) |
| A47J 19/02 | (2006.01) |

(52) U.S. Cl.
CPC .................. *A23N 1/02* (2013.01); *A23L 2/04* (2013.01); *A47J 19/025* (2013.01); *A23V 2002/00* (2013.01)

(58) Field of Classification Search
CPC ......... A23N 1/02; A23L 2/04; A23V 2002/00; A47J 19/025
USPC ................. 99/495, 503, 504, 509, 510, 513; 426/489
See application file for complete search history.

(56) References Cited

U.S. PATENT DOCUMENTS

| | | | |
|---|---|---|---|
| 8,025,156 B2 * | 9/2011 | Tapp ...................... | B01D 29/35 100/117 |
| 2009/0049998 A1 * | 2/2009 | Kim ........................ | A47J 19/06 99/510 |
| 2012/0325946 A1 * | 12/2012 | Charles ................... | A47J 19/06 241/79 |
| 2013/0327232 A1 * | 12/2013 | Charles ................... | A23N 1/02 99/510 |

FOREIGN PATENT DOCUMENTS

| | | |
|---|---|---|
| KR | 10-1263910 B1 | 5/2013 |
| WO | 2010/007290 A2 | 1/2010 |

OTHER PUBLICATIONS

Search Report dated Feb. 5, 2015 in corresponding application No. FR 1454845.

* cited by examiner

*Primary Examiner* — Thien S Tran

(74) *Attorney, Agent, or Firm* — Knobbe, Martens, Olson & Bear, LLP

(57) ABSTRACT

An electrical appliance includes a rotating food processing screw for processing food items exiting the outlet of a chute. The screw is coupled to an electric drive motor for driving the screw in rotation about itself around its central axis. An upper part of the screw has a sweeper for sweeping the outlet of the chute, and a lower part drives down towards the bottom and presses the food fragments coming from the upper part of the screw. Food blocking elements can block the food items. An inscribed sphere, which is geometrically defined by the chute, is movable within the interior of an upper part of a chamber receiving the screw. Two zones of contact between the inscribed sphere and the blocking elements are formed, and a third zone of contact is between the inscribed sphere and the sweeper.

15 Claims, 12 Drawing Sheets

ELECTRIC APPLIANCE FOR PREPARING JUICE BY PRESSING FOOD

CROSS-REFERENCE TO RELATED APPLICATION

This application claims priority to French Patent Application No. 1454845 filed on May 28, 2014, the disclosure of which including the specification, the drawings, and the claims is hereby incorporated by reference in its entirety.

FIELD OF THE INVENTION

The present invention relates to an electrical juice preparing appliance for the preparation of juice by pressing food.

BACKGROUND OF THE INVENTION

This type of apparatus is well known: within the interior of a separation chamber for separating the juice, a pressing screw, typically of ogival shaped form, is driven in rotation by an appropriate electric motor, whose mechanical outlet is coupled to the base of the screw, while food, introduced from the top of the chamber via an inlet chute directed downwards, are, under the action of the screw, gradually pushed down towards the bottom and pressed against the interior surface of the bottom of the chamber. The juice is collected for consumption thereof by the user, whereas separately, pressed residues of food are removed. The interesting advantage of this type of apparatus is the ability to obtain quality juice, while largely preserving their taste and organoleptic properties. Examples of such type of apparatus are provided, among other documents, in WO-A-2010/007290.

One of the technical limitations of this type of device is the maximum size of food that can be pressed. Indeed, in order for the pressing screw to be able to "catch" these foods and begin to drive them down towards the bottom so as to press them, it is necessary for a given diameter of the screw, for these foods to be of sufficiently small dimensions, with the maximum size of these food units to typically be less than the largest radius of the pressing screw. The user is then often forced to cut the food into pieces before introducing them into the apparatus. For example, the introduction of a whole apple is impossible.

In order to work around this problem, the document WO-A-2010/007290, by way of the embodiments illustrated in its FIGS. 1-5, proposed to arrange, between the outlet of the inlet chute and a lower portion of the pressing screw, a food fragmentation member, which consists of a cutting edge or a cutting blade and which is carried by an upper portion of the screw: as a result of the rotation of the screw, this cutting edge or blade sweeps the outlet of the chute, in such manner that the food coming out of the chute gets cut into two units. The operational execution of such a food cutting process, however, poses practical difficulties. In order to effectively cut a food item, especially one having a form shape that is close to a sphere and/or having a certain surface hardness, such as an apple, it is necessary to hold in position the food item when the cutting edge or cutting blade is applied to this food item: in WO-A-2010/007290, this holding in position is brought about by a rotational blocking member provided in the chute, as well as by a pusher that the user must push in the chute and hold pressed against the food item in order to prevent it from returning back up into the chute during application of the cutting edge or cutting blade on the food item. This locking member and this pusher, that are essential to the operation of the apparatus of WO-A-2010/007290, constitute operating constraints. Moreover, given the fact that the food is fragmented into two units cut up cleanly, there is still the likelihood of the largest of these units having a dimension still too large for it to be "caught" by the pressing screw, with the potential drawback of remaining stuck at the top of the screw, in particular when the food item has a form shape that is close to a sphere and/or has a certain surface hardness, such as an apple.

SUMMARY OF THE INVENTION

The object of the present invention is thus to provide an apparatus of the type described above, wherein the fragmentation of food prior to the pressing thereof is improved, in particular, by being more efficient and less constraining for the user.

To this end, the object of the invention relates to an electrical juice preparation device for preparing juice by pressing food, comprising:
  a chute for introducing food items in downward direction, which chute geometrically defines an inscribed sphere that is able to pass freely through the chute;
  a food processing screw for processing the food items exiting out of the chute, which screw:
    is centered on an axis;
    is coupled to an electric drive motor for driving the screw in rotation about itself around the axis;
    includes a screw upper part which is provided with a sweeper for sweeping the outlet of the chute so as to act on the food items exiting out of the chute in order to fragment them; and
    includes a screw lower part which is designed to drive down towards the bottom and press the food fragments coming from the screw upper part; and
  a chamber for receiving the screw, which chamber:
    is centered on the axis,
    includes a chamber upper part, which chamber upper part is connected to the outlet of the chute for receiving the food items exiting out of the chute and surrounds and encloses the screw upper part; and
    includes a chamber lower part, which chamber lower part surrounds and encloses the screw lower part and is designed for separating the juice from the food fragments when the latter are pressed by the screw lower part of the;
  wherein the chamber upper part is internally provided with blocking elements for blocking in rotation the food items when the latter are in contact with the sweeper, in such manner that, at the outlet of the chute, the said inscribed sphere is movable within the interior of the chamber upper part, to as far as a fragmentation position, in which:
    by formation of a first zone of contact between the inscribed sphere and the blocking elements, the blocking elements counter and prevent the rolling of the inscribed sphere in the direction of rotation of the screw against an interior surface of the chamber upper part;
    by formation of a second zone of contact between the inscribed sphere and the blocking elements, the blocking elements counter and prevent the rolling of the inscribed sphere in the direction opposite to the direction of rotation of the screw against the interior surface of the chamber upper part, this second zone of contact being formed in one half of the inscribed sphere which is turned to be facing away from the axis and which is delimited by a diametral plane of the inscribed sphere, that is both parallel to the axis and passing through the first zone of contact; and by formation of a third zone of contact between the inscribed sphere and the sweeper, the sweeper crushes the inscribed sphere in the direction of rotation of the screw, this third zone of contact being formed in the half of the inscribed sphere, opposite to the half in which the second zone of contact is formed.

One of the ideas underlying the invention is to arrange the upper part of the chamber receiving the pressing screw, for holding in place "large" food units when they find themselves in contact with the sweeper designed for the fragmenting thereof. To this end, the invention provides that the inscribed sphere defined by the inlet chute, which, geometrically, substantially corresponds to the largest pseudo-spherical food item allowable in the chute, is movable, from the chute, without blockage within the interior of the upper part of the chamber, to as far as a so-called position of fragmentation, wherein, without intervention from the user, the special blocking elements, carried by the internal face of the upper part of the chamber, maintain in this position this inscribed sphere, while the sweeper, carried by the upper part of the screw, is able to apply to this inscribed sphere a crushing stress. The blocking elements are designed, both to prevent the inscribed sphere from rolling against the interior surface of the upper part of the chamber in the direction of rotation of the screw, by forming, as it were, an anti-roll stop for the inscribed sphere, as well as to prevent the inscribed sphere from rolling in the opposite direction, by forming, as it were, an anti-escape stop for this inscribed sphere. The inscribed sphere thereby being firmly held in position by the blocking elements, which act on a portion of the inscribed sphere corresponding substantially to the vertical half turned to be facing away from the screw, the invention provides that the sweeper is able to act effectively over the rest of the inscribed sphere, substantially corresponding to the other vertical half, by crushing it. Thus, when the user introduces into the chute a large food unit, that is to say a food unit whose form is shaped close to that of the said inscribed sphere, this food unit moves without blockage, in particular under the effect of its own weight, in the chute and then in the upper part of the chamber, until coming to occupy the position of fragmentation, in which it is crushed to the point of breaking by shearing in a substantially vertical and median plane of the food. Quite obviously, owing to the very nature of the food unit, the breaking of the latter, resulting from the crushing thereof, lead to the formation of two or more fragments of food, of small sizes and having irregular shapes, which are easily and quickly "caught" by the lower part of the screw for the purposes of pressing thereof. Thanks to the invention, for a given pressing screw diameter, large sized food items, such as whole apples, may be introduced into the apparatus with a view to their pressing, with this introduction to be advantageously carried out along the axis of the screw, by means of centering, along this axis, of at least the outlet of the chute, or even the entire chute, in order to then allow for a maximum diametral dimensioning for the aforementioned inscribed sphere.

According to advantageous additional characteristic features of the device in accordance with the invention, taken into consideration individually or in accordance with any technically possible combinations:

the third zone of contact is situated, in the direction of the axis, at a level which is higher than that of the first and second zones of contact;

the blocking elements comprise ribs which project out from the interior surface of the chamber upper part, and which include a first rib and a second rib cooperating therebetween by contact with the inscribed sphere in order to form respectively the first zone of contact and the second zone of contact when the inscribed sphere is in the position of fragmentation, the said second rib immediately preceding the said first rib in the direction of rotation the screw;

four ribs are provided and are distributed regularly around the axis;

the blocking elements are also capable of guiding downwards towards the bottom the food items that they block in rotation;

the ribs are formed by portions of a helix centered on the axis, which are wound downwards in the direction of rotation of the screw;

the blocking elements extend into the chamber lower part in order to block in rotation the food fragments when the latter are pressed by the screw lower part;

the interior surface of the chamber upper part delimits a concave surface, from which the blocking elements are projecting out and which is toroidal in a manner centered on the axis;

the sweeper comprises, a crushing edge of the screw upper part, which is formed so as to crush the food items;

the crushing edge of the sweeper is turned towards the axis and extends downward towards the bottom while being helically wound about the axis;

the outlet of the chute is internally centered on the axis;

the entire chute is internally centered on the axis;

a top end of the screw upper part forms a ring, which is centered on the axis, from which the sweeper extends downward towards the bottom and within the interior of which the outlet of the chute is connected to the chamber upper part in a manner so as to let pass freely the said inscribed sphere;

the screw is provided, at a top end thereof, with connecting means for connecting to the electric drive motor for driving the screw in rotation;

the connecting means are secured in a detachable manner to the top end of the screw.

BRIEF DESCRIPTION OF THE DRAWINGS

The invention will be better understood upon reading the description that follows, provided purely by way of non-limiting example and with reference being made to the drawings in which.

DESCRIPTION OF EMBODIMENTS OF THE INVENTION

In FIGS. 1 to 13 the illustration represent an appliance 1 to be used for preparing juice from foods, particularly from fruits and vegetables, by the pressing of such foods.

Figure 6:
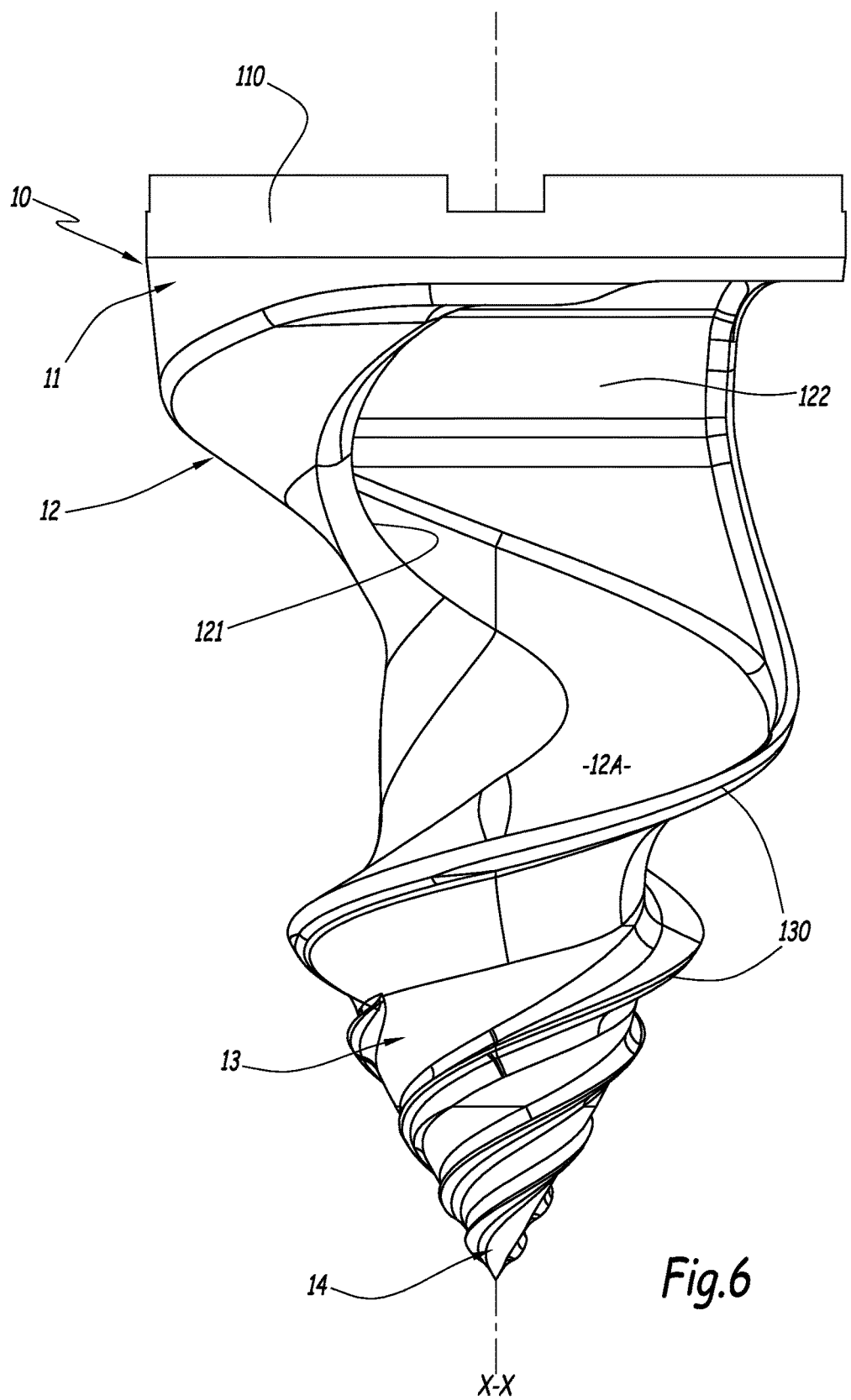
FIG. 6 is an elevational view showing one single other component of the device
Figure 9:
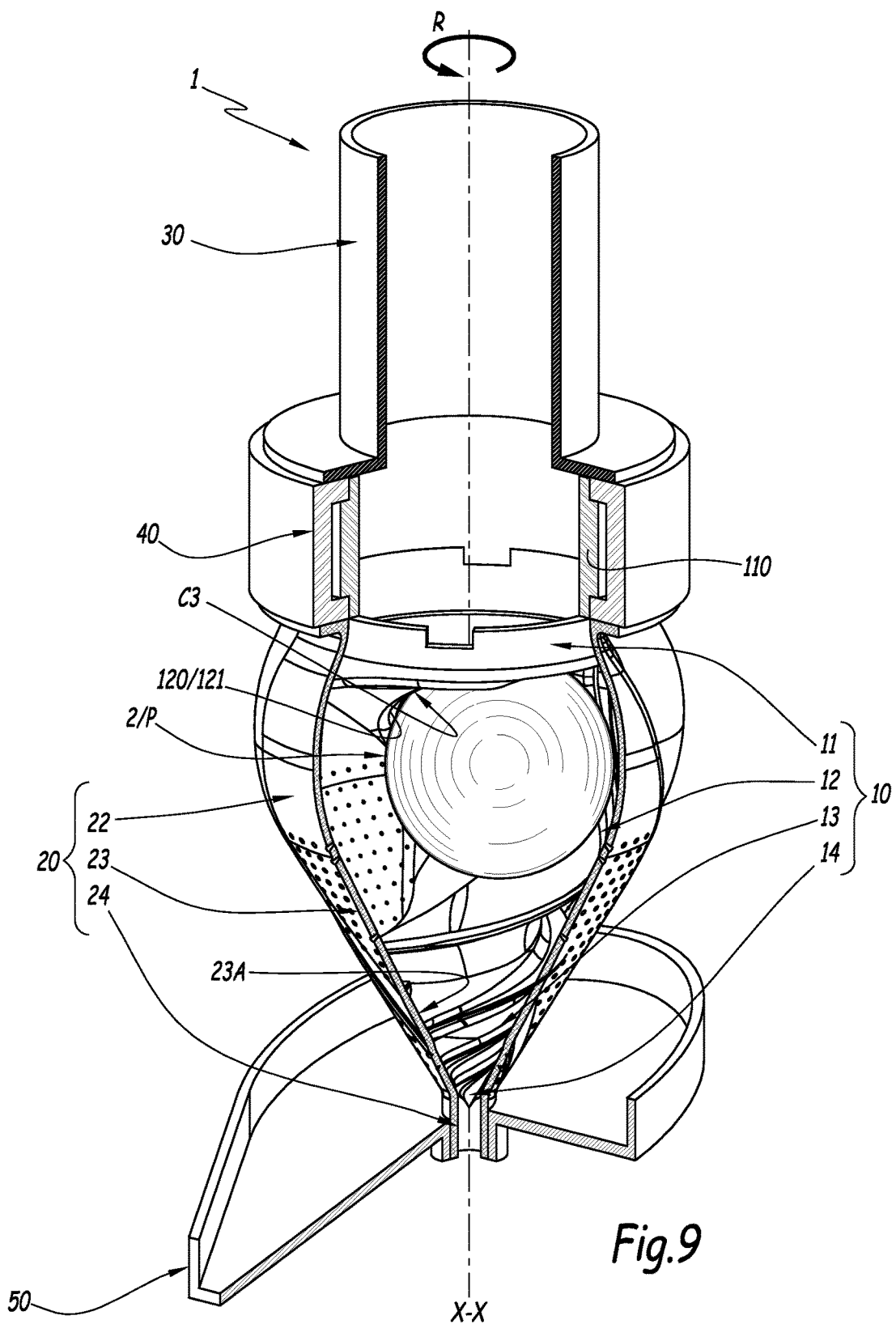
Figure 10:
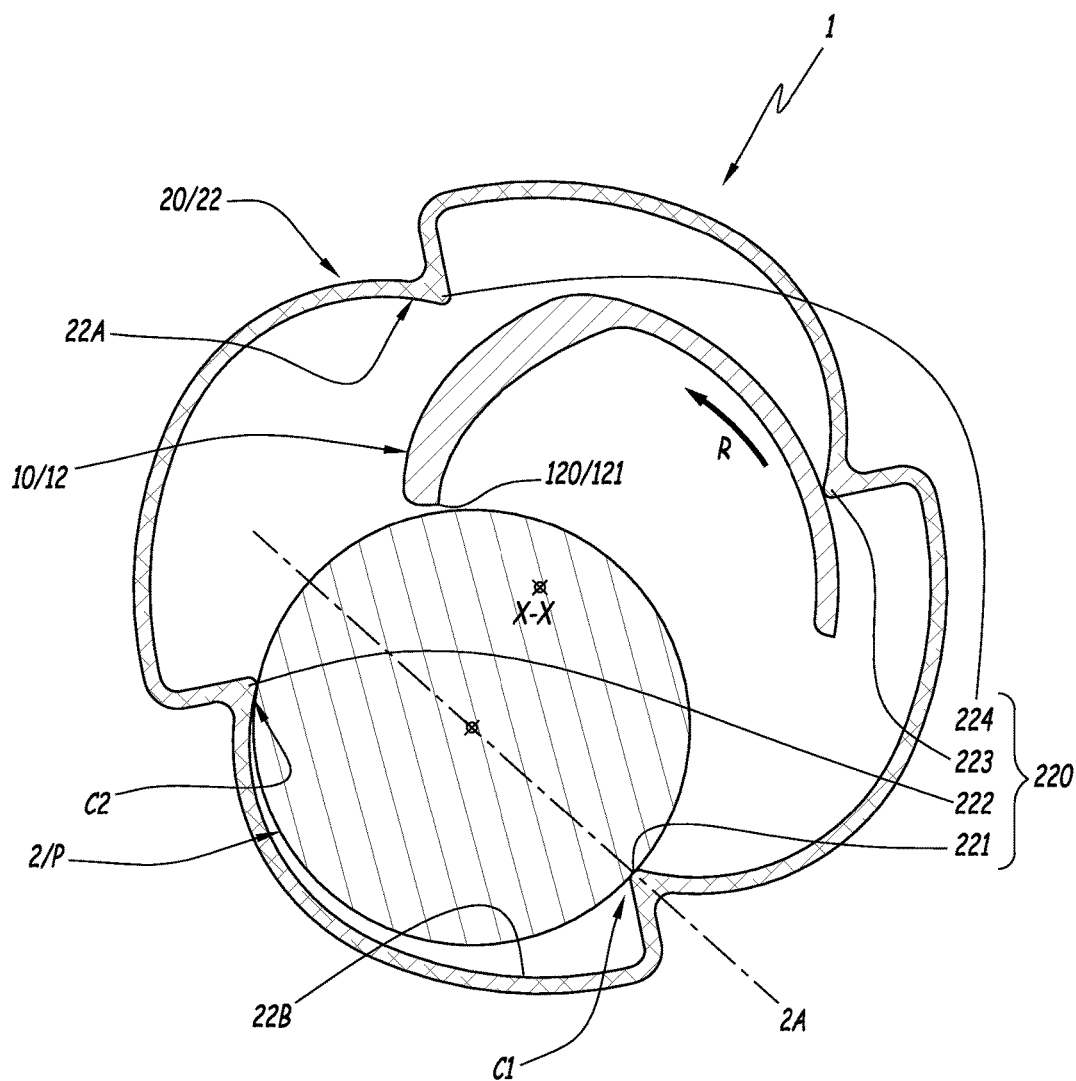
FIG. 10 is a view that is similar to that in FIG. 3, shown with the sphere represented in FIG. 9
Figure 11:
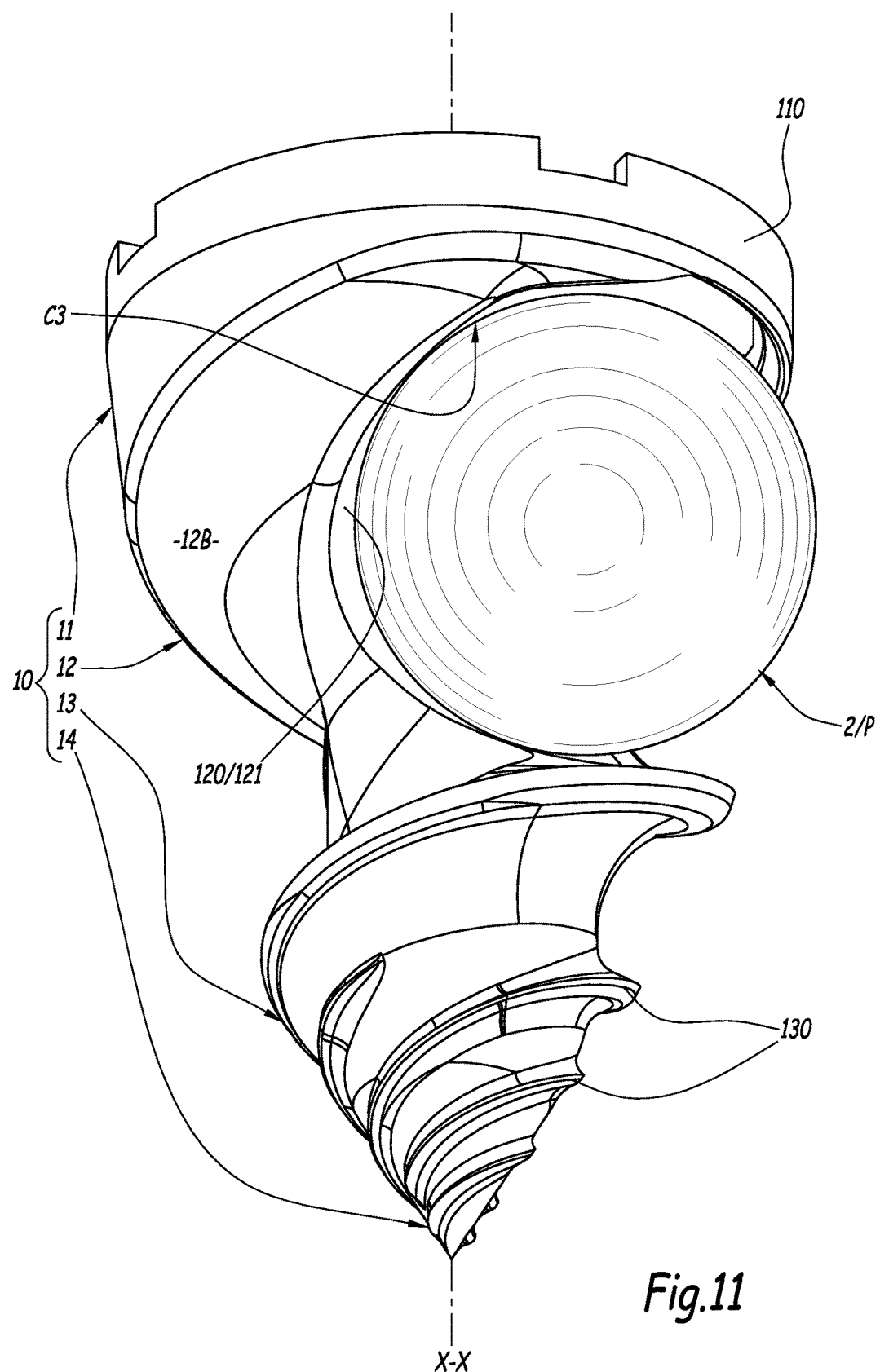
FIG. 11 is an elevational view of the component shown in FIG. 6, shown together with the sphere represented in FIG. 9.

The appliance 1 comprises a food processing screw 10 for processing foods, in particular for pressing of these foods, which is shown on its own in FIGS. 6 and 11 and which is visible, within the appliance 1, in FIGS. 3, 4, 7 to 10, 12 and 13. This screw 10 defines a central axis X-X about which the screw, within the appliance 1, is drivable in rotation about itself and this being in a predetermined direction of rotation, as indicated by the arrow R in the figures. In practice, when the appliance 1 is used, the device is rested on a table or, more generally, a substantially horizontal working plane, in a manner such that the axis X-X is vertical or substantially vertical: in these circumstances, for the sake of convenience, the present document is oriented relative to the axis X-X, the terms "top" and "upper" corresponding to a direction which, along the axis X-X, is turned towards the top, that is to say in the direction away from the work plane on which the appliance 1 rests. The terms "lower" and "down" correspond to an axial direction in the opposite direction.

In the embodiment considered in the figures, the screw 10 includes, in a successive manner in the direction of the axis X-X, the following
- a top end 11, which presents an overall shape of a ring, centered on the axis X-X and running in continuous unbroken fashion all around this axis X-X;
- an upper part 12, which presents an overall helical shaped form, winding substantially around the axis X-X and extending down towards the bottom from the top end 11;
- a lower part 13, which presents a generally frustoconical shaped form, centered on the axis X-X and converging towards the bottom, and
- a bottom end 14, which presents an overall cone tip shaped form, centered on the axis X-X and incorporated in the downward extending section of the lower part 13.

Other characteristic features of the screw 10 and its parts 11 to 14 shall be described subsequently, in connection with other components of the appliance 1.

The appliance 1 further includes a chamber 20 within which the screw 10 is received in such manner as to have the ability to be driven in rotation about itself around the axis X-X relative to this chamber 20. In practice, the chamber 20 is fixed relative to the working plane on which the appliance 1 is rested when the latter is being operated. Moreover, in a manner not shown in detail in the figures, this chamber 20 is, within the appliance 1, possibly integrally attached to an external frame of this device, this not being limiting aspect of the present invention.

Figure 1:
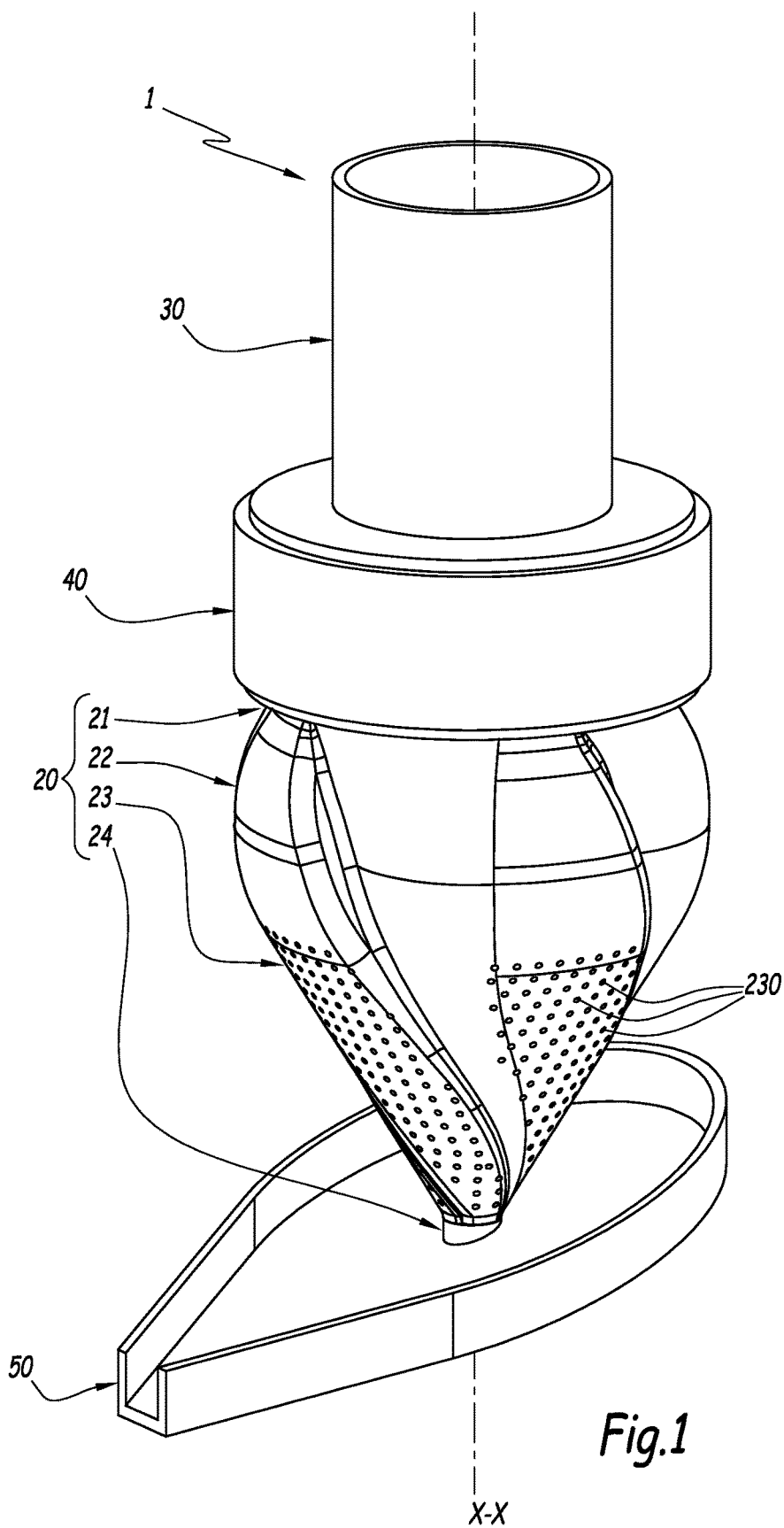
FIG. 1 is a view in perspective of a device according to an embodiment of the invention
Figure 2:
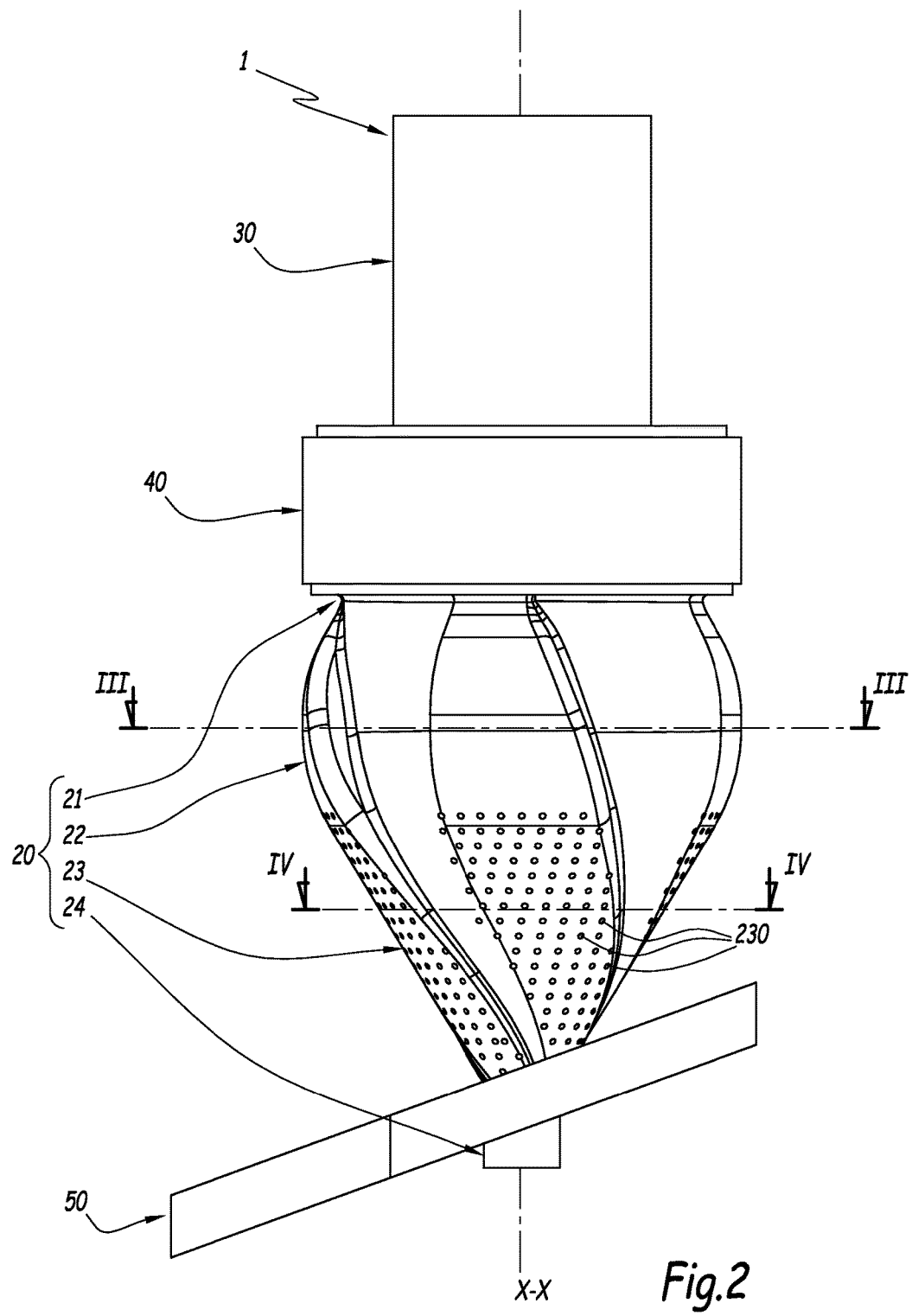
FIG. 2 is an elevational view of the device shown in FIG. 1
Figure 3:
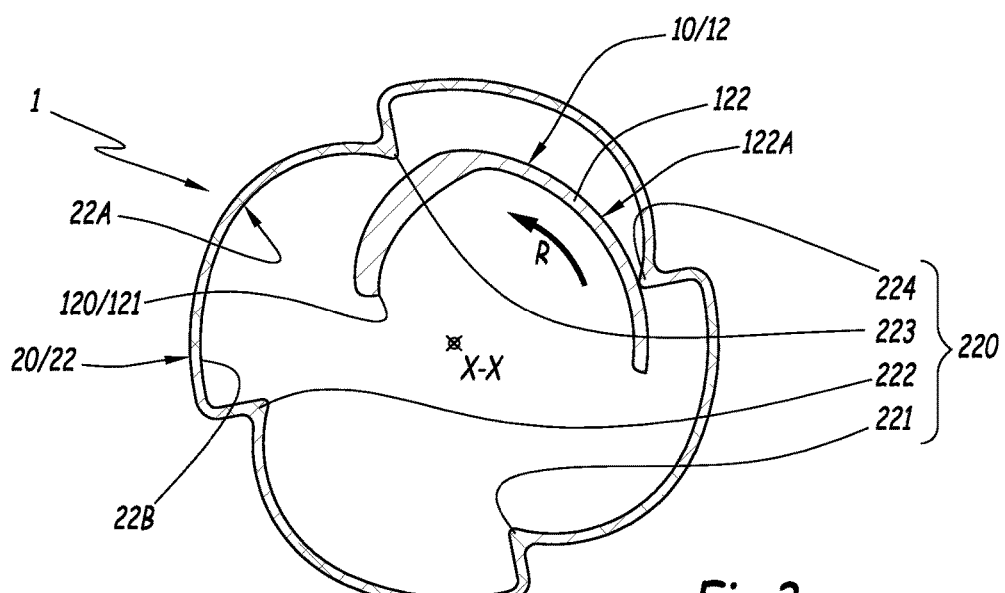
FIGS. 3 and 4 are cross sections along the respective lines III-III and IV-IV of FIG. 2
Figure 4:
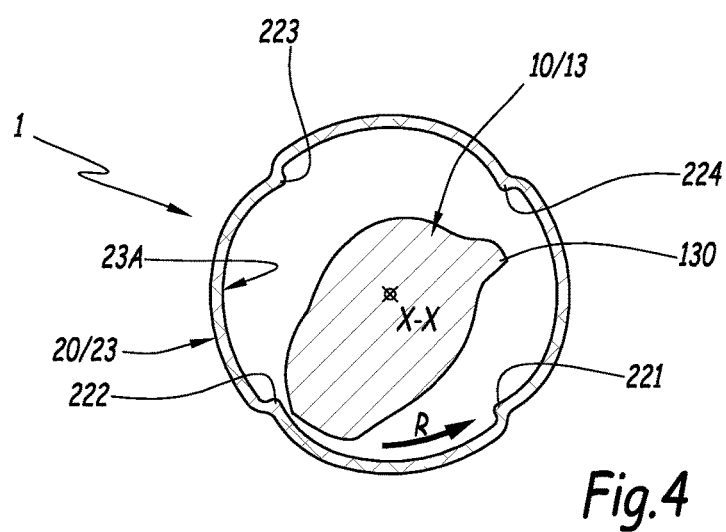
Figure 7:
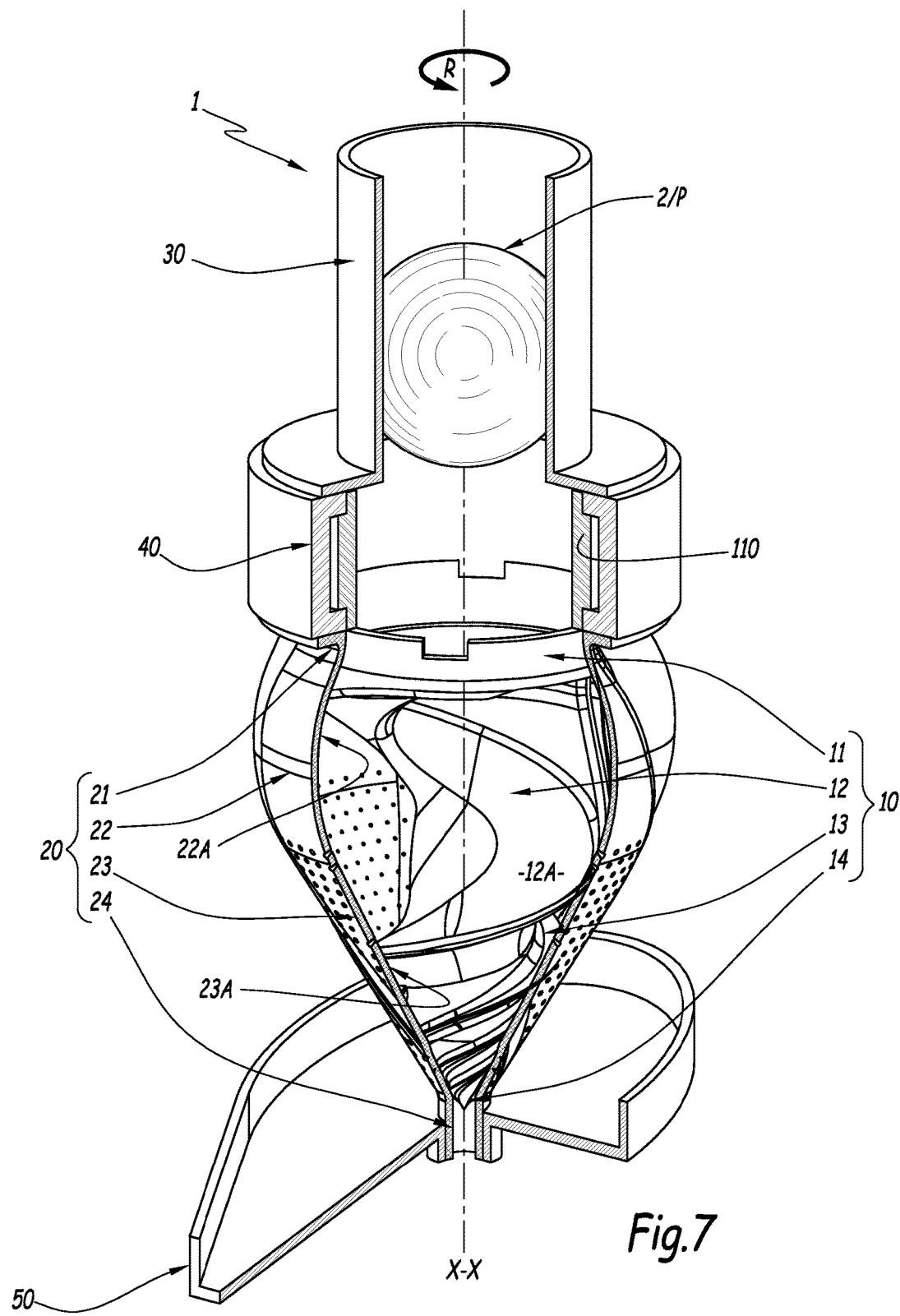
FIGS. 7 to 9 are views in perspective of the device, in partial cross section, these three views respectively illustrating three different positions of a sphere introduced into the device.

The chamber 20 is centered on the axis X-X, in the sense that it delimits an internal volume which, as may well be seen in FIGS. 3, 4 and 7, internally receives the screw 10 in a substantially coaxial manner.

In the embodiment considered in the figures, the chamber 20 comprises of, successively in the direction of the axis X-X, the following
- a top end 21, which surrounds and encloses the top end 11 of the screw 10, while running all around the exterior of this end 11 of the screw and extending axially in radial relation to the said end 11 of the screw, and which receives the end 11 of the screw 10 in a substantially complementary manner, thereby centering the chamber 20 on the axis X-X
- an upper part 22, which surrounds and encloses the upper part 12 of the screw 10, while running all around the exterior of this part 12 of the screw and extending axially in radial relation to this part 12 of the screw, and of which most of the interior surface 22A is spaced radially apart from the upper part 12 of the screw 10
- a lower part 23, which surrounds and encloses the lower part 13 of the screw 10, while running all around the exterior of this part 13 of the screw and which extends axially in radial relation to this part 13 of the screw, and which is internally complementary to the lower part 13 of the screw 10, thus presenting an interior surface 23A which is conical, centered on the axis X-X and converging towards the bottom and
- a bottom end 24, which surrounds and encloses the bottom end 14 of the screw 10, while running all around the exterior of this end 14 of the screw and extending axially at least in radial relation to this end 14 of the screw, or even, as in this case, lower than this end 14 of the screw, and which has an overall tubular shaped form, centered on the axis X-X and open at its two opposite axial ends.

Other characteristic features of the chamber 20 and its parts 21 to 24 shall be described subsequently, in connection with the rest of the appliance 1.

The appliance 1 also comprises a chute 30 through which are introduced the food items that are to be processed within the chamber 20 by means of the screw 10.

In the example of embodiment considered here, the chute 30 has an overall tubular shaped form, centered on the axis X-X. In practice, other embodiments may be possibly envisaged for the chute 30, so long as the downwards opening mouth of this chute is connected to the upper part 22 of the chamber 20 in order for the food items introduced into the chute to reach this upper part of the chamber.

In all cases, the chute 30 geometrically defines an inscribed sphere 2, which is drawn in the FIGS. 7 to 11 and which represents the largest sphere that may be introduced into the chute 30 and reach the outlet thereof without being blocked in the chute. In other words, as clearly seen in FIG. 7, the inscribed sphere 2 is a fictional three-dimensional geometric object, consisting of "the largest ball" that can reach without being blocked, that is to say, without interference of the complete stopping of movement, the outlet of the chute 30, from the exterior of the appliance 1 via the interior of the chute. It is to be understood that this inscribed sphere 2 simulates the largest spherical food item that can be introduced whole into the appliance 1 in order to obtain the juice. By way of non-limiting example, the interior diameter of the chute 30 amounts to about 80 mm, which is tantamount to saying that the inscribed sphere 2 has a diameter of the same value.

In practice, the chute 30 is fixed within the appliance 1, by being integrally secured, directly or indirectly, to the chamber 20, with the downwards opening mouth of the chute 30 overlying the screw 10. In the example of embodiment considered in the figures, the bottom end of the chute 30 is integrally secured to the top end 21 of the chamber 20 by means of a fixed assembly piece 40 which belongs for example to the above noted frame of the appliance 1. By way of a variant not shown, the component piece 40 is produced in the form of an extension upwards of the top end 21 of the chamber 20 and/or an extension downwards of the bottom end of the chute 30.

At the axial level of the connecting region between the chamber 20 and the chute 30, here in the interior of the assembly piece 40, the top end 11 of the screw 10 is provided with connecting means 110 for connecting to an electric drive motor, not shown, for driving the screw 10 in rotation about the axis X-X, the said electric motor being housed, for example in the aforesaid frame of the appliance 1. In the figures, the connecting means 110 are shown only in a schematic manner. In practice, these connecting means 110 may have various highly diverse forms, as long as these connecting means provide for at least one part of the coupling between the above noted electric motor and the top end 11 of the screw 10 in a manner so as to drive this screw in rotation about itself around the axis X-X. By way of non-limiting example, these connecting means 110 are mechanical and consist of a crown, a gear, a drum, etc., more generally, a rotating component piece, centered on the axis X-X and driven in rotation about itself by a cable, a belt, etc., externally surrounding the rotating component piece and set in motion by the electric motor mentioned above.

In all cases, it is to be understood that, in operation, the connecting means 110 are connected in rotation to the top end 11 of the screw 10, by being integrally secured to this top end of the screw by any appropriate means, advantageously in a detachable manner in order to allow for, when the appliance 1 is not in operation, the disassembling of the connecting means 110 from the screw 10 and thus facilitate the cleaning thereof.

Whatever be the embodiment of the connection means 110, it is to be noted that their presence at the top end 11 of the screw 10 substantially stiffens this end 11 of the screw, which is to say, that these connecting means 110 firmly fix in position the axis X-X within the appliance 1, by absorbing the radial forces applied to the screw 10 during its rotation, in particular applied to its top end 11 and its upper part 12, without such radial forces being absorbed, at least not substantially, at the centering interface between the top end 11 of the screw 10 and the top end 21 of the chamber 20. It also to be understood that this aspect of driving of the screw 10 by its top end 11, advantageously having a ring shaped form, constitutes an interesting beneficial specificity which is independent of the technical considerations relating to the rest of this pressing screw.

Figure 8:
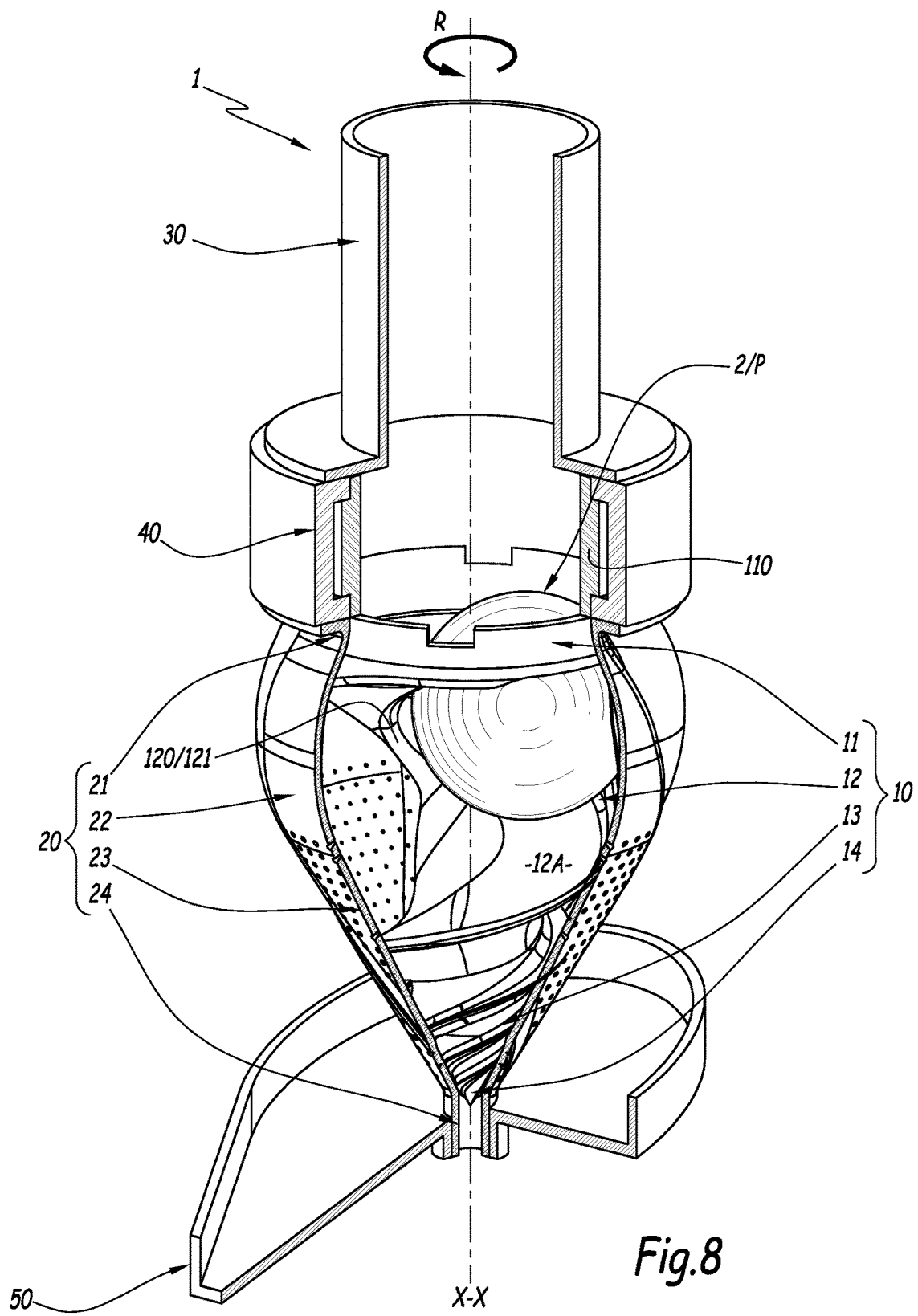

In light of the presence of the connecting means 110 at the top end 11 of the screw, the outlet to the bottom of the chute 30 is connected to the interior volume of the upper part 22 of the chamber 20 through the interior of the ring formed by the top end 11. Thus, the food items exiting from the chute 30 reach, via the top end 11 of the screw 10, surrounded by the top end 21 of the chamber 20, the upper part 22 of the chamber 20 in order to be processed therein by the upper part 12 of the screw 10. The interior diameter of the ring formed by the top end 11 of the screw 10 is at least equal to, or even slightly greater than the diameter of the inscribed sphere 2 in such manner that this sphere passes freely, that is to say, without interference of blocking, from the outlet of the chute 30 to the interior of the upper part 22 of the chamber 20, via the interior of the top end 11 of the screw, as shown in FIG. 8.

At the axial level of the upper parts 12 and 22 of the screw 10 and the chamber 20, it is expected to process the foods with a view to their subsequent pressing at the level of lower parts 13 and 23 of the screw and the chamber.

To this end, In the embodiment considered in the figures, the upper part 12 of the screw 10 delimits a surface 12A turned to be facing the top, for guiding the food units from interior of the top end 11 of the screw right until the exterior of the lower part 13 of the screw: as may well be seen in FIG. 6, this guide surface 12A is helical, winding itself substantially around the axis X-X and linking the interior surface of the ring formed by the top end 11 to the exterior surface of the largest diameter of the conical lower part 13. As shown in the FIGS. 8, 9 and 11, the guide surface 12A is provided, in particular on account of its inclination, for letting the inscribed sphere 2 remain movable downward towards the bottom from the interior of the top end 11 of the screw, and this along a substantially helical overall trajectory resulting from imaginary rolling and/or sliding of this sphere 2 over the guide surface 12A in the interior of the upper part 22 of the chamber.

In addition 20, the upper part 12 of the screw 10 is provided with a sweeper 120 for sweeping the outlet of the chute 30, designed for, within the interior of the upper part 22 of the chamber, causing fragmenting of the food items exiting from the chute 30 prior to the food fragments reaching the lower part 23 of the chamber 20 in order to be pressed therein by the lower part 13 of the screw 10. In the example of embodiment considered in the figures, the sweeper 120 consists of a crushing edge 121 for crushing food items, delimited by the upper part 12 of the screw 10. This crushing edge 121 extends down towards the bottom from the ring formed by the top end 11 of the screw 10, while being turned towards the axis X-X and winding helically around this axis, until the lower part 13 of the screw 10 as may well be seen in the FIGS. 6 and 7. For reasons which will become apparent subsequently, the crushing edge 121 need not be a sharp or cutting edge, in the sense that, when it is acting on food items to fragment them, it is not designed for slicing them by means of distinctly dividing the material of the food on both sides of the edge, but rather this edge 121 has been designed, by its shape, to crush the food until the breaking of the material of the latter by way tearing and/or splitting.

In order for the action of the sweeper 120 on the food items to be effective and efficient with a view to fragmentation thereof, the upper part 22 of the chamber 20 is internally provided with blocking elements 220 which ensure the blocking in rotation of the food items when the latter are in contact with the sweeper 120. In the example of embodiment considered in the figures, these blocking elements 220 consist of four ribs 221, 222, 223 and 224 which, as may well be seen in the FIGS. 3 and 4, are individually identical to each other, are uniformly distributed in a regular manner around the axis X-X and extend each projecting out towards the axis X-X from the interior surface 22A of the upper part 22 of the chamber 20. These ribs 221 to 224 constitute the portions of the interior surface 22A of the upper part 22 of the chamber 20, which are radially closest to the axis X-X.

The crushing edge 121 and the ribs 221 to 224, more generally the sweeper 120 and the blocking elements 220, are arranged and dimensioned in relation to the inscribed sphere 2, in the sense that, in the interior of the upper part 22 of the chamber 20, this inscribed sphere 2 is movable until reaching a position of fragmentation, imposed on the inscribed sphere by the said sweeper 120 and the said blocking elements 220, this displacement of the inscribed sphere 2 up to this position of fragmentation being advantageously guided within the interior of the upper part 22 of the chamber 20 by the guide surface 12A as previously indicated above. More precisely, when the inscribed sphere 2 occupies the aforementioned fragmentation position, which is represented in the FIGS. 9 to 11, several zones of contact are formed between, on the one hand, the inscribed sphere and, on the other hand, the sweeper 120 and the blocking elements 220, namely:

- a first zone C1 of contact between the inscribed sphere 2 and a first of the ribs 221 to 224, in this case the rib 221 shown in FIG. 10, in such a way that, by acting on the inscribed sphere by this zone of contact C1, the rib 221 prevents the rolling of the inscribed sphere in the direction of rotation R of the screw 10 against the interior surface 22A of the upper part 22 of the chamber 20
- a second zone C2 of contact between the inscribed sphere 2 and a second rib which immediately precedes the aforementioned first rib in the direction of rotation R of the screw 10, in this case the rib 222 shown in FIG. 10, in such a way that, by acting on the inscribed sphere by this second zone of contact C2, this second rib prevents the rolling of the inscribed sphere in the direction opposite to the direction of rotation R of the screw against the interior surface 22A of the upper part 22 of the chamber 20, the second zone of contact C2 being formed in the half of the inscribed sphere, which is turned to be facing away from the axis X-X and which is delimited by a diametral plane, denoted by 2A in FIG. 10, of the inscribed sphere, that is both parallel to the axis X-X and passing through the first zone of contact C1; and
- a third zone of contact C3 between the inscribed sphere 2 and the crushing edge 121 of the screws 10, in such a way that, by acting on the inscribed sphere by this third zone of contact C3 during the rotation of the screw, the crushing edge 121 crushes the inscribed sphere in the direction of rotation R of the screw, this zone of contact C3 being formed in the half of the inscribed sphere, which is opposite to the half within which is formed the second zone of contact C2.

In the embodiment considered in the figures, it is to be noted that, in the cross sectional plane of FIG. 10, the zones of contact C1 and C2 are shown, while the third zone of contact C3 is not visible: this results from the fact that the first and second zones of contact C1 and C2 are situated substantially at the same axial level, that is to say, that of the cross sectional plane of FIG. 10, whereas the zone of contact C3 is situated at a different axial level, in this case higher than the axial level of the cross sectional plane of FIG. 10.

Whether or not they are at different axial levels, the three zones of contact C1, C2 and C3, provide the ability, during rotation of the screw 10, to apply to the inscribed sphere two shear stresses that are substantially in its diametral plane 2A: at the level of the zone of contact C1, the rib 221 forms an anti-rolling stop in the direction of rotation R for the inscribed sphere 2, in such a way that, at the level of the zone of contact C3, the crushing edge 121 is able to press on the half, turned towards the axis X-X, of the sphere 2 outside of the diametral plane 2A of this latter, while preventing the inscribed sphere from escaping the action of the crushing edge 121 by moving away from the axis X-X and/or returning back up towards the top, due to the blocking thereof, at the level of the zone of contact C2, by the rib 222, which thus forms an anti-escape stop for the inscribed sphere.

Quite obviously, it is to be understood that the configuration of fragmentation, which has been described above in connection with FIGS. 9 to 11, constitutes only one of four possible positions of fragmentation within the interior of the upper part 22 of the chamber 20, evenly distributed in a regular manner about the axis X-X, in conjunction with the distribution of the four ribs 221 to 224 around this axis.

Furthermore, due to the fact that the ribs 221 to 224 constitute the portions of the interior surface 22A of the upper part 22 of the chamber 20 that are radially closest to the axis X-X, an advantageous option is constituted in that, as may be clearly seen in FIGS. 3 and 6, the upper part 12 of the screw 10 includes, in its exterior periphery, a wall 122, which has an overall half-tube shaped form, centered on the axis X-X, which borders the exterior periphery of the guide surface 12A and of which the exterior surface 122A is dimensioned so as to be substantially tangential to the ribs 221 to 224, with the interposition of a functional clearance so as not to induce wear: this arrangement between the ribs 221 to 224 and the upper part 12 of the screw 10 induces an effect of scraping of the surface 122A so as to avoid the accumulation of food residues.

In accordance with an advantageous embodiment, the interior surface 22A of the upper part 22 of the chamber 20 is constituted, exclusive of the portions thereof occupied by the ribs 221 to 224, and exclusive as well of its zone of connection with the top end 21 of the chamber and of its zone of connection with the lower part 23 of the chamber, of a concave surface 22B, from which the ribs 221 to 224 are projecting out and which is toroidal in a manner centered on the axis X-X: the toroidal conformation of this concave surface 22B makes it possible, in the deepest portion thereof, to accentuate the protruding extension of the ribs 221 to 224 and thus to enhance their food blocking effect, while also conferring on the interior surface of the chamber 20 a non-angular profile at least over the axial height of the upper part 22.

Figure 5:
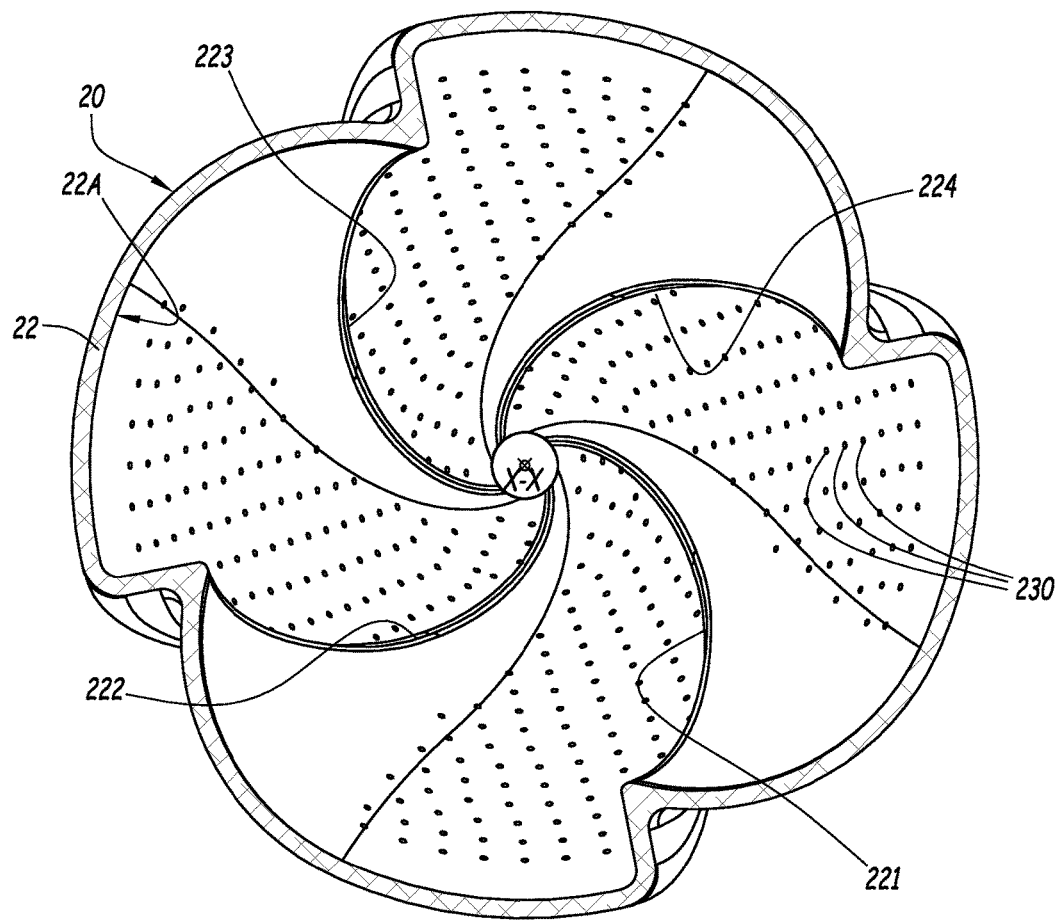
FIG. 5 is a cross section along line III-III of FIG. 2, showing only one of the components of the device

Also by way of an advantageous option, each of the ribs 221 to 224 is formed in a portion of the helix that is centered on the axis X-X, which is wound downwards in the direction of rotation of the screw 10, as may well be seen in FIG. 5: in this way, in addition to their food blocking function, the ribs 221 to 224 have a guide function of guiding the food items towards the bottom against the interior surface 22A of the upper part 22 of the chamber 20.

With regard to the complementary and conical lower parts 13 and 23, of the screw 10 and of the chamber 20, it is to be noted that the lower part 13 of the screw is externally provided with threads 130, which wind down towards the bottom from the guide surface 12A of the upper part 12 of the screw 10, more generally from the zone of connection between this guide surface 12A and the exterior surface of the screw, until the bottom end 14 of the screw, advantageously being extended over the exterior surface of this bottom end 14. These threads 130 have been designed for, during rotation R of the screw 10, driving down towards the bottom, in the interior of the lower part 23 of the chamber 20, the fragments of food that come from the upper part 22 of the chamber and that enter the lower portion 23 of the chamber, via a passage which, towards the top, is delimited by the crushing edge 121 and which, towards the bottom, is delimited by the guide surface 12A, more generally by the zone of connection between this guide surface 12A and the exterior surface of the screw. In their upper part, the threads 130 "catch" the food fragments that have just crossed over the passage noted above, this catching being facilitated, by way of advantageous options visible in FIGS. 6 and 11, by providing that at least in the lower region, the upper part of the screw 12 delimits a helical surface 12B turned to be facing the bottom, in order for, during rotation R of the screw, pushing the fragments of food down towards the bottom, and/or
  at least one of the threads 130 extends towards the top over the exterior surface of the upper part 12 of the screw.

After catching the fragments of food, the threads 130 are designed, always when the screw 10 is driven in rotation around the axis X-X, for pressing these fragments of food against the interior surface 23A of the lower part 23 of the chamber 20, as and when these food fragments are driven down towards the bottom within the interior of the lower part 23 of the chamber, more precisely between the interior surface 23A of this lower part 23 and the exterior surface of the lower part 13 of the screw.

The lower part 23 of the chamber 20 is provided with through orifices 230 for sieving the food, through which the resulting juice obtained from the pressing of the fragments of food passes from the interior to the exterior of the lower part 23 of the chamber 20. More generally, it is to be understood that the lower part 23 of the chamber 20 is designed for separating the juice from the food fragments when the latter are pressed by the lower part 13 of the screw 10, this juice passing into the exterior of the lower part 23 of the chamber 20, while the residues of the pressed food remain within the interior of this lower part 23 of the chamber.

The complementary conical shapes of the lower part 13 of the screw 10 and the lower part 23 of the chamber 20, on the one hand, render concentric the radial forces applied to the lower part 13 of the screw during the pressing of the food by this screw driven in rotation, the sum of these radial forces being substantially zero, which limits any tendency towards misalignment of the screw within the interior of the chamber 20, and, on the other hand, enhances the mechanical resistance and strength of the lower part 23 of the chamber 20 relative to the radial forces applied to this lower part, by distributing in part the corresponding stresses towards the top and towards the bottom, which serves to prevent local overstressing.

In line with the considerations outlined above, an advantageous embodiment consists of fabricating the lower part 23 of the chamber 20 from a single piece of metal, typically out of a metal sheet perforated with orifices 230. That being said, by way of a variant, the lower part 23 of the chamber may be fabricated in multiple pieces, made out of metal or some other material.

By way of an advantageous option, which makes it possible in particular to improve the pressing of the food fragments, the ribs 221 to 224 of the upper part 22 of the chamber 20 extend into the lower part 23 of the chamber: as may well be seen in FIG. 4, the downward extensions of the ribs 221 to 224 make it possible, in the lower part 23 of the chamber 20, to block in rotation the fragments of food when the latter are driven by the threads 130 of the lower part 13 of the screw 10.

In the axial level of the bottom end 24 of the chamber 20, the interior of this end 24 of the chamber channels, towards the bottom and in a manner centered on the axis X-X, the pressed food residues coming from the interior of the lower part 23 of the chamber, the downward driving of these residues towards the bottom being advantageously reinforced by the tip of the cone forming the bottom end 14 of the screw 10 when the latter is driven in rotation about the axis X-X. In other words, the bottom end 24 of the chamber 20 constitutes a discharge outlet for discharging the pressing residues to the exterior of the chamber 20. With this discharge of residues taking place along the axis X-X, it proves to be particularly effective, especially without inducing resistance to the flow of residues from the lower part 23 of the chamber 20, for facilitating the exit out of this chamber.

In line with the considerations previously outlined above, it is to be noted that this discharge outlet, formed by the bottom end 24 of the chamber 20, does not interfere internally with any of the arrangements and adjustments of the appliance 1, which makes it possible to drive the screw 10 in rotation: in fact, as explained above, the screw 10 is driven in rotation by making use of the connecting means 110 provided at the top end 11 of the screw 10, while the cone tip that forms the bottom end 14 of the screws is free and received without contact in the interior of the discharge outlet formed by the end 24 of the chamber 20.

As an option, not shown in the figures, the discharge outlet that is formed by the bottom end 24 of the chamber 20 is provided with means, known per se, to be used for regulating resistance to the flow of the pressing residues through this discharge outlet: by way of example, such regulating means comprise a diaphragm for partial closure of the flow cross section across the discharge outlet, with the extent of action of this diaphragm being adjustable; or indeed these regulating means comprise a partial closure valve for partially closing the downwards opening mouth of the discharge outlet, the position of this valve being adjustable by means of a servo mechanism.

Externally, the lower end 24 of the chamber 20 is surrounded by a collection container or, more generally, by a collector 50 for collecting the juice coming from the exterior of the lower part 23 of the chamber 20.

An example of use of the appliance 1 will now be described, which will more specifically be in reference to the FIGS. 7 to 12 while considering that the item introduced into the appliance 1 is a whole apple P whose form and dimensions are substantially identical to those of the inscribed sphere 2 previously considered above.

Thus, during the initial stage, while the appliance 1 is in operation, in particular with its screw 10 driven in rotation about itself around the axis X-X by the aforementioned drive motor, the apple P is introduced downwards within the interior of the chute 30. The apple P descends in the interior of this chute, under the effect of its own weight, as represented in FIG. 7.

After reaching the upper part 22 of the chamber 20 by passing without blockage through the interior of the top end 11 of the screw 10, the apple P rolls and/or slides down towards the bottom against the guide surface 12A, until it comes in contact with the interior surface 22A of the upper part 22 of the chamber, as shown in FIGS. 9 to 11: through the maintaining of the rotational driving of the screw 10, the apple P is found to be in one of four positions of fragmentation, previously described above, for example the position of fragmentation shown in FIGS. 9 to 11. While the apple P is firmly blocked by cooperation between its external half and the two ribs 221 to 224, in this case the ribs 221 and 222 in FIGS. 9 to 11, the crushing edge 121 of the screw 10 crushes the internal half of the apple P in the direction of rotation R of the screw.

Figure 12:
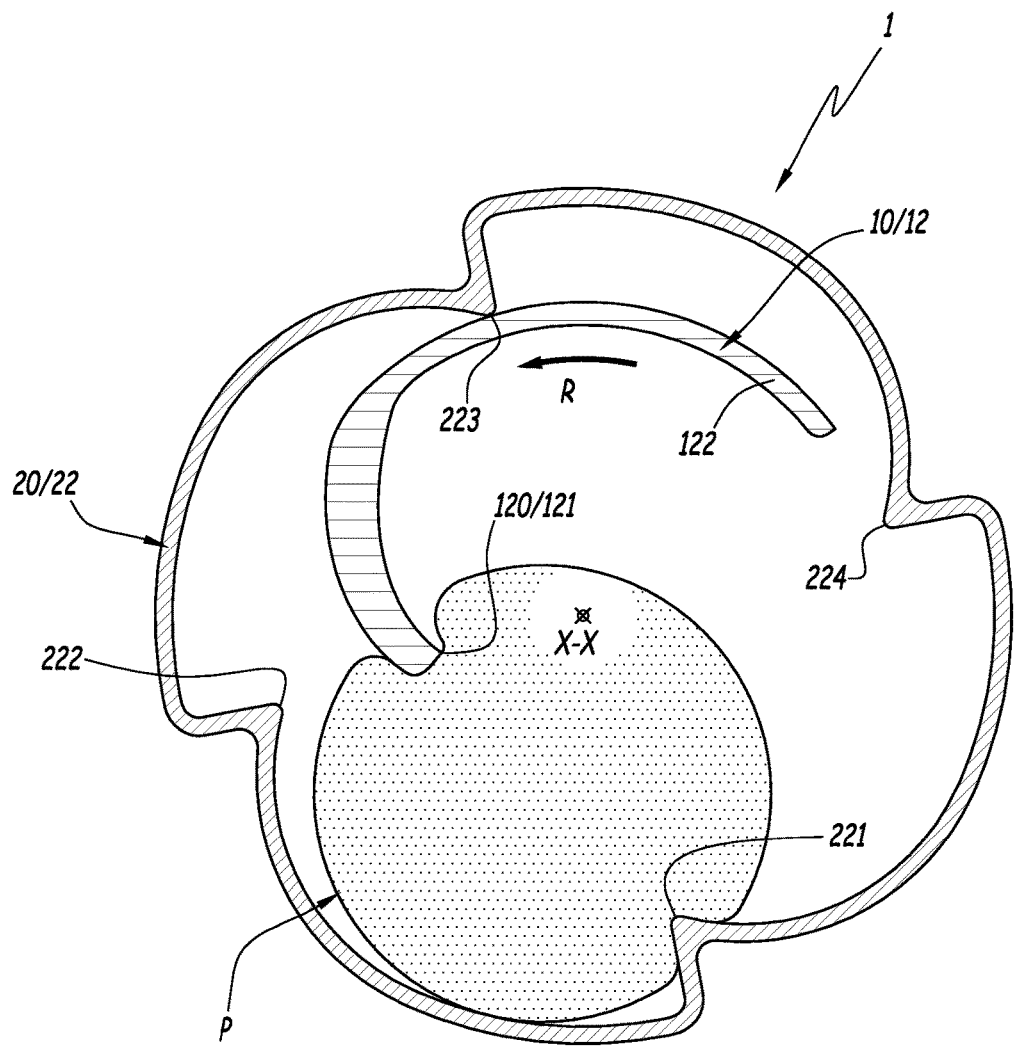
FIGS. 12 and 13 are views that are similar to that in FIG. 10, schematically illustrating respectively two successive stages of fragmentation of a food item in the device.
Figure 13:
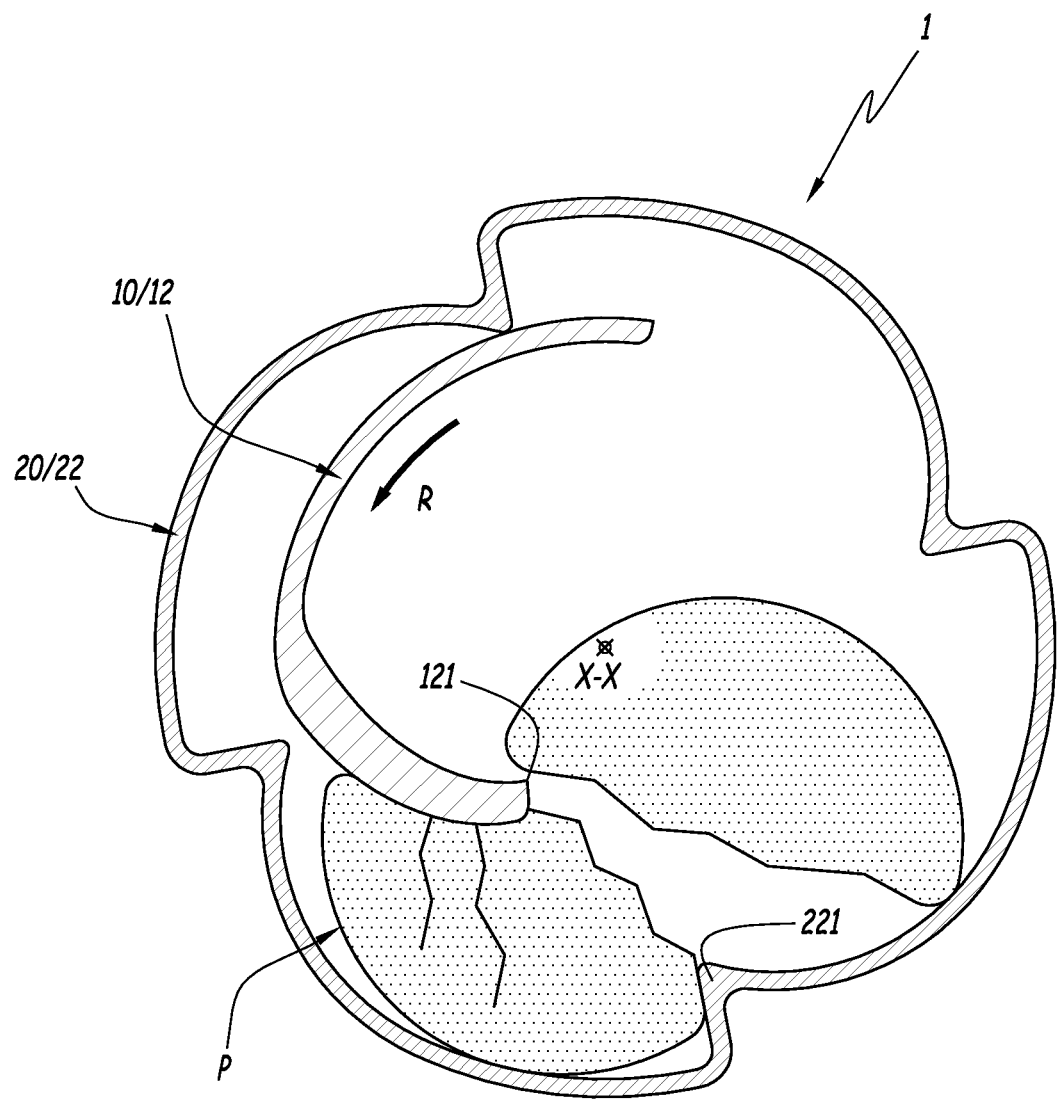

In view of the nature of the material constituting the apple P this crushing edge 121 tends to get thrust into the apple P, while also thrusting in this apple the rib 221, as illustrated in FIG. 12. Then, as shown in FIG. 13, the apple P breaks, by initiation in a diametrical plane between its two halves noted above and then by tearing of its matter, while forming two or more fragments which have irregular shapes and forms, related to the splitting and/or distortion of the matter of the apple. The fragment or fragments facing away from the axis X-X are found to be introduced into the lower part 23 of the chamber 20 via the passage delimited between the crushing edge 121 and the guide surface 12A this or these fragments are then progressively driven and pressed at the interface between the conical and complementary lower parts 13 and 23, of the screw 10 and of the chamber 20. It is to be noted that the apple fragments are particularly easy to "catch" by the threads 130 of the screw 10 when the fragmentation by breaking of the apple P is initiated in a substantially diametral plane of the apple, which is inclined relative to the vertical, while providing for the axial displacement of the zone of contact C3 relative to the zones of contact C1 and C2.

The juice resulting from the pressing of this or these fragments is recovered from the exterior of the chamber 20 by the collector 50, while the pressing residues are removed along the axis X-X by the bottom end 24 of the chamber.

Various appropriate arrangements and variants of the appliance 1 described so far may also possibly be envisaged. By way of example, instead of driving the screw 10 in rotation by its top end 11, this screw may be driven by its bottom end, by then forgoing the discharge of the pressing residues along the axis X-X and, if appropriate, also foregoing the conical shaped form for the lower part 13 of the screw.

What is claimed is:

1. An electrical juice preparation appliance for preparing juice by pressing food, comprising
   a chute for introducing food items in downward direction, which chute geometrically defines an inscribed sphere that is able to pass freely through the chute
   a food processing screw for processing the food items exiting out of the chute, which screw:
      is centered on an axis
      is coupled to an electric drive motor for driving the screw in rotation about itself around the axis
      includes a screw upper part which is provided with a sweeper for sweeping an outlet of the chute so as to act on the food items exiting out of the chute in order to fragment them; and
      includes a screw lower part which is designed to drive downward and press the food fragments coming from the screw upper part; and
   a chamber for receiving the screw, which chamber
      is centered on the axis,
      includes a chamber upper part, which chamber upper part is connected to the outlet of the chute for receiving the food items exiting out of the chute and surrounds and encloses the screw upper part; and
      includes a chamber lower part, which chamber lower part surrounds and encloses the screw lower part and is designed for separating juice from the food fragments when the latter are pressed by the screw lower part;
   wherein a top end of the screw upper part forms a ring, which is centered on the axis, from which the sweeper extends downward and within the interior of which the outlet of the chute is connected to the chamber upper part in a manner so as to let pass freely the inscribed sphere, and
   wherein the chamber upper part is internally provided with blocking elements for blocking in rotation the food items when the latter are in contact with the sweeper, in such manner that, at the outlet of the chute, the inscribed sphere is movable within the chamber upper part, to as far as a fragmentation position, in which:
      by formation of a first zone of contact between the inscribed sphere and the blocking elements, the blocking elements counter and prevent rolling of the inscribed sphere in the direction of rotation of the screw against an interior surface of the chamber upper part;
      by formation of a second zone of contact between the inscribed sphere and the blocking elements, the blocking elements counter and prevent the rolling of the inscribed sphere in a direction opposite to the direction of rotation of the screw against the interior surface of the chamber upper part, this second zone of contact being formed in one half of the inscribed sphere which is turned to be facing away from the axis and which is delimited by a diametral plane of the inscribed sphere, that is both parallel to the axis and passing through the first zone of contact; and
      by formation of a third zone of contact between the inscribed sphere and the sweeper, the sweeper crushes the inscribed sphere in the direction of rotation of the screw, this third zone of contact being formed in a half of the inscribed sphere, opposite to the half in which the second zone of contact is formed.

2. An appliance according to claim 1, wherein in that the third zone of contact is situated, in the direction of the axis, at a level which is higher than that of the first and second zones of contact.

3. An appliance according to claim 1, wherein the blocking elements comprise ribs which project out from the interior surface of the chamber upper part and which include a first rib and a second rib cooperating therebetween by contact with the inscribed sphere in order to form respectively the first zone of contact and the second zone of contact when the inscribed sphere is in the position of fragmentation, the second rib immediately preceding the first rib in the direction of rotation the screw.

4. An appliance according to claim 3, wherein four ribs are provided and are distributed regularly around the axis.

5. An appliance according to claim 1, wherein the blocking elements are also capable of guiding downwards the food items that they block in rotation.

6. An appliance according to claim 3, wherein the ribs are formed by portions of a helix centered on the axis, which are wound downwards in the direction of rotation of the screw.

7. An appliance according to claim 1, wherein the blocking elements extend into the chamber lower part in order to block in rotation the food fragments when the latter are pressed by the screw lower part.

8. An appliance according to claim 1, wherein the interior surface of the chamber upper part delimits a concave surface, from which the blocking elements are projecting out and which is toroidal in a manner centered on the axis.

9. An appliance according to claim 1, wherein the sweeper comprises, a crushing edge of the screw upper part, which is formed so as to crush the food items.

10. An appliance according to claim 9, wherein the crushing edge of the sweeper is turned towards the axis and extends downward while being helically wound about the axis.

11. An appliance according to claim 1, wherein the outlet of the chute is internally centered on the axis.

12. An appliance according to claim 1, wherein the entire chute is internally centered on the axis.

13. An appliance according to claim 1, wherein the screw is provided, at a top end thereof, with connecting means for connecting to the electric drive motor for driving the screw in rotation.

14. An appliance according to claim 13, wherein the connecting means are secured in a detachable manner to the top end of the screw.

15. An appliance according to claim 1, wherein the ring formed by the top end of the screw is provided with connecting means for connecting to the electric drive motor for driving the screw in rotation.

* * * * *